United States Patent
Mei et al.

(10) Patent No.: US 10,691,962 B2
(45) Date of Patent: Jun. 23, 2020

(54) SYSTEMS AND METHODS FOR REAR SIGNAL IDENTIFICATION USING MACHINE LEARNING

(71) Applicant: Toyota Motor Engineering & Manufacturing North America, Inc., Erlanger, KY (US)

(72) Inventors: Xue Mei, Ann Arbor, MI (US); Naoki Nagasaka, Ann Arbor, MI (US); Kuan-Hui Lee, Ann Arbor, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 242 days.

(21) Appl. No.: 15/713,491

(22) Filed: Sep. 22, 2017

(65) Prior Publication Data

US 2019/0092318 A1  Mar. 28, 2019

(51) Int. Cl.
| | |
|---|---|
| *G06K 9/00* | (2006.01) |
| *B60W 30/09* | (2012.01) |
| *G06K 9/46* | (2006.01) |
| *B60Q 9/00* | (2006.01) |
| *G06K 9/66* | (2006.01) |
| *G06K 9/32* | (2006.01) |
| *G06N 3/08* | (2006.01) |

(Continued)

(52) U.S. Cl.
CPC ......... *G06K 9/00825* (2013.01); *B60Q 9/008* (2013.01); *B60W 30/09* (2013.01); *B60W 30/0956* (2013.01); *G06K 9/3233* (2013.01); *G06K 9/4628* (2013.01); *G06K 9/4671* (2013.01); *G06K 9/66* (2013.01); *G06N 3/04* (2013.01); *G06N 3/084* (2013.01); *B60W 2420/42* (2013.01); *B60W 2554/00* (2020.02); *G06K 2209/23* (2013.01)

(58) Field of Classification Search
CPC ........................ G06K 9/00825; B60W 2420/42
See application file for complete search history.

(56) References Cited

U.S. PATENT DOCUMENTS

| | | | |
|---|---|---|---|
| 8,977,007 B1 * | 3/2015 | Ferguson | G06K 9/00825 340/988 |
| 9,305,223 B1 | 4/2016 | Ogale et al. | |

(Continued)

*Primary Examiner* — Todd M Melton
(74) *Attorney, Agent, or Firm* — Christopher G. Darrow; Darrow Mustafa PC

(57) ABSTRACT

System, methods, and other embodiments described herein relate to identifying rear indicators of a nearby vehicle. In one embodiment, a method includes, in response to detecting a nearby vehicle, capturing signal images of a rear portion of the nearby vehicle. The method includes computing a braking state for brake lights of the nearby vehicle that indicates whether the brake lights are presently active by analyzing the signal images according to a brake classifier. The method includes computing a turn state for rear turn signals of the nearby vehicle that indicates which of the turn signals are presently active by analyzing regions of interest from the signal images according to a turn classifier. The brake classifier and the turn classifier are comprised of a convolutional neural network and a long short-term memory recurrent neural network (LSTM-RNN). The method includes providing electronic outputs identifying the braking state and the turn state.

20 Claims, 8 Drawing Sheets

(51) Int. Cl.
*G06N 3/04* (2006.01)
*B60W 30/095* (2012.01)

(56) References Cited

U.S. PATENT DOCUMENTS

| | | | |
|---|---|---|---|
| 9,317,757 B2 | 4/2016 | Winter et al. | |
| 9,619,720 B2 * | 4/2017 | Liken | G06K 9/00825 |
| 10,049,279 B2 * | 8/2018 | Li | G06K 9/6269 |
| 10,061,322 B1 * | 8/2018 | Palefsky-Smith | G06T 11/60 |
| 2008/0165028 A1 * | 7/2008 | Fechner | G06K 9/3241 |
| | | | 340/901 |
| 2017/0174261 A1 | 6/2017 | Micks et al. | |
| 2019/0019087 A1 * | 1/2019 | Fukui | G06N 20/00 |
| 2019/0087672 A1 * | 3/2019 | Wang | G06K 9/00825 |

* cited by examiner

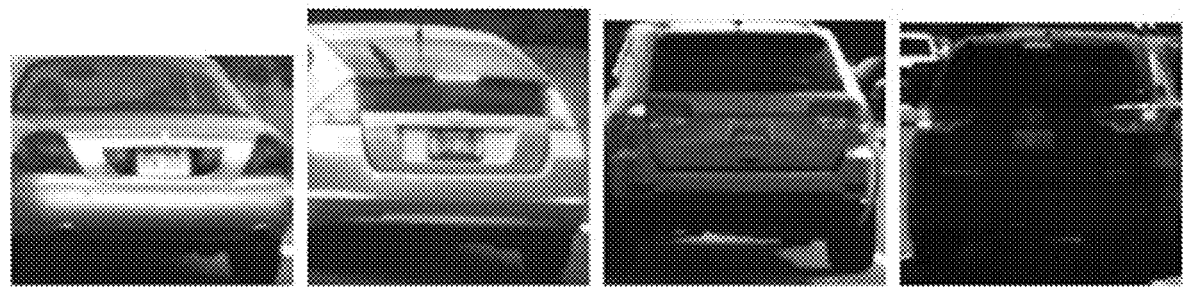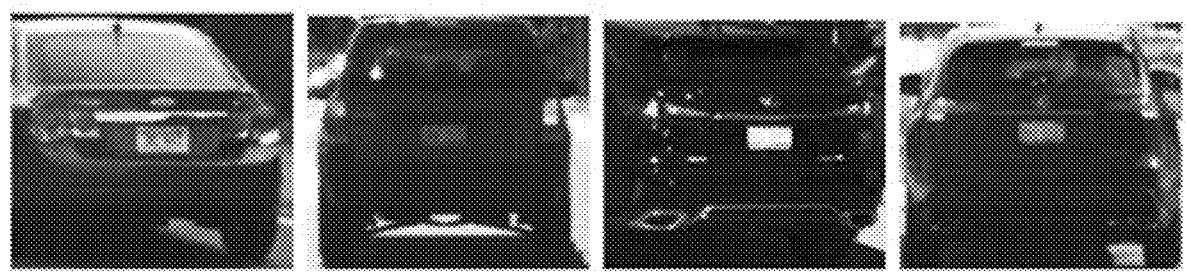
FIG. 3

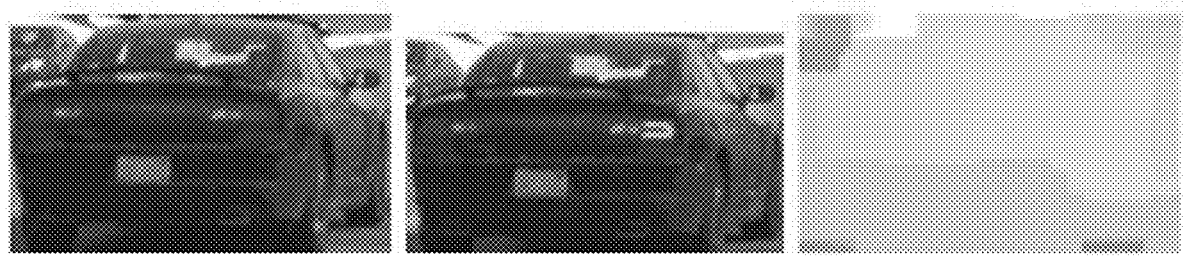
(a) $x_{i-1}$  (b) $x_i$  (c) SIFT flow
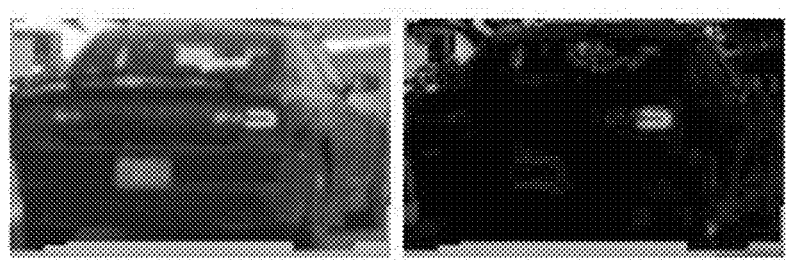
(d) $w_i$  (e) $w_i - x_{i-1}$
FIG. 7

SYSTEMS AND METHODS FOR REAR SIGNAL IDENTIFICATION USING MACHINE LEARNING

TECHNICAL FIELD

The subject matter described herein relates in general to systems for identifying vehicle rear indicator signals and, more particularly, to identifying brake and turn signal states using machine learning.

BACKGROUND

Autonomous vehicles and various safety/advanced assistance systems rely on sensors and analysis of the data provided by the sensors in order to accurately and precisely perform different functions such as navigating a surrounding environment. That is, the sensors perceive data about the environment which is then interpreted for use in evaluating how to proceed within the environment or perform other actions. As part of perceiving the environment and interpreting the sensor data, a vehicle system perceives and interprets actions, locations, and trajectories associated with objects in the environment such as other vehicles. Moreover, identifying rear indicator signals of nearby vehicles can also assist with anticipating trajectories and dynamic aspects of the nearby vehicles in the environment.

However, accurately detecting and identifying rear indicator signals of a vehicle can encounter various difficulties. One example of a difficulty associated with identifying rear indicator signals involves accurately determining locations of the rear signals. That is, because different makes/models of vehicles can have different configurations of rear signal lights, accurately determining locations and states of the rear signals can be cumbersome. Moreover, further aspects such as the movement of the vehicles, different blinking and/or brake light patterns and other aspects can further add to the difficulties. Consequently, while identifying rear indicator signals of a vehicle is useful when operating the noted systems, the process of identifying the rear indicator signals includes many difficulties which can provide inaccurate results.

SUMMARY

Example systems and methods are disclosed herein that relate to a manner of identifying rear signal indicators of a nearby vehicle. For example, a signal identification system monitors for nearby vehicles and, in response to detecting a nearby vehicle, uses a series of camera images to identify rear indicator signals. The signal identification system can be embedded within a host vehicle to monitor an area proximate to the host vehicle for other vehicles that are nearby. Thus, upon detecting that a nearby vehicle is present, the camera(s) capture a series of images (e.g., 16 images) of a rear section of the nearby vehicle that can be used to identify a present state for turn signals and brake signals. In one embodiment, a brake classifier accepts the raw images as an electronic input and analyzes the images using a combination of deep learning routines. That is, the brake classifier first determines spatial features within the images using a convolutional neural network to process the images and output the spatial features. Thereafter, the spatial features are fed into a long short-term memory recurrent neural network (LSTM-RNN) that iteratively processes images to ascertain whether the brake lights are presently active.

Furthermore, the signal identification system determines the turn state using a turn classifier that functions in a similar manner as the brake classifier. However, prior to feeding the images into the turn classifier, the system transforms the images to provide regions of interest. That is, in one embodiment, the images are processed to highlight particular regions (i.e., turn signals) and thereby improve identification. For example, a motion compensation algorithm can be applied to the images to produce flow images that account for relative motion between vehicles. Thereafter, the flow images are compared to determine differences (e.g., areas with changing pixel intensity). Subsequently, regions of interest within the difference images are identified and provided to the turn classifier.

The turn classifier processes the regions of interest from the images according to a convolutional neural network to further identify spatial features within the images. Thereafter, a separate long short-term memory recurrent neural network (LSTM-RNN) iteratively processes the images to identify temporal information that correlates with dynamic flashing states of the turn signals. In this way, the signal identification system implements a structure for identifying rear indicator signals that overcomes the noted difficulties and thus improves identification through accounting for temporal changes and variations caused by variable luminance and motion.

In one embodiment, a signal identification system for identifying rear indicators of a nearby vehicle is disclosed. The signal identification system includes one or more processors and a memory that is communicably coupled to the one or more processors. The memory stores a monitoring module including instructions that when executed by the one or more processors cause the one or more processors to, in response to detecting the nearby vehicle, capturing signal images of a rear portion of the nearby vehicle. The signal identification system includes an indicator module including instructions that when executed by the one or more processors cause the one or more processors to i) compute a braking state for brake lights of the nearby vehicle that indicates whether the brake lights are presently active by analyzing the signal images according to a brake classifier, and ii) compute a turn state for rear turn signals of the nearby vehicle that indicates which of the turn signals are presently active by analyzing regions of interest from the signal images according to a turn classifier. The brake classifier and the turn classifier are comprised of a convolutional neural network and a long short-term memory recurrent neural network (LSTM-RNN). The indicator module includes instructions to provide electronic outputs identifying the braking state and the turn state.

In one embodiment, a non-transitory computer-readable medium for identifying rear indicators of a nearby vehicle is disclosed. The non-transitory computer-readable medium stores instructions that when executed by one or more processors cause the one or more processors to perform the disclosed functions. The instructions include instructions to compute a braking state for brake lights of the nearby vehicle that indicates whether the brake lights are presently active by analyzing signal images according to a brake classifier. The signal images being captured of a rear portion of the nearby vehicle. The instructions include instructions to compute a turn state for rear turn signals of the nearby vehicle that indicates which of the turn signals are presently active by analyzing regions of interest from the signal images according to a turn classifier. The brake classifier and the turn classifier are comprised of a convolutional neural network and a long short-term memory recurrent neural network (LSTM-RNN). The instructions include instructions to provide electronic outputs identifying the braking state and the turn state.

In one embodiment, a method of identifying rear indicators of a nearby vehicle is disclosed. The method includes, in response to detecting the nearby vehicle, capturing signal images of a rear portion of the nearby vehicle. The method includes computing a braking state for brake lights of the nearby vehicle that indicates whether the brake lights are presently active by analyzing the signal images according to a brake classifier. The method includes computing a turn state for rear turn signals of the nearby vehicle that indicates which of the turn signals are presently active by analyzing regions of interest from the signal images according to a turn classifier. The brake classifier and the turn classifier are comprised of a convolutional neural network and a long short-term memory recurrent neural network (LSTM-RNN). The method includes providing electronic outputs identifying the braking state and the turn state.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 3 is one example of different brake and turn signal states.

FIG. 7 illustrates an example image at different stages of generating a difference image using a SIFT flow algorithm.

DETAILED DESCRIPTION

Figure 1:
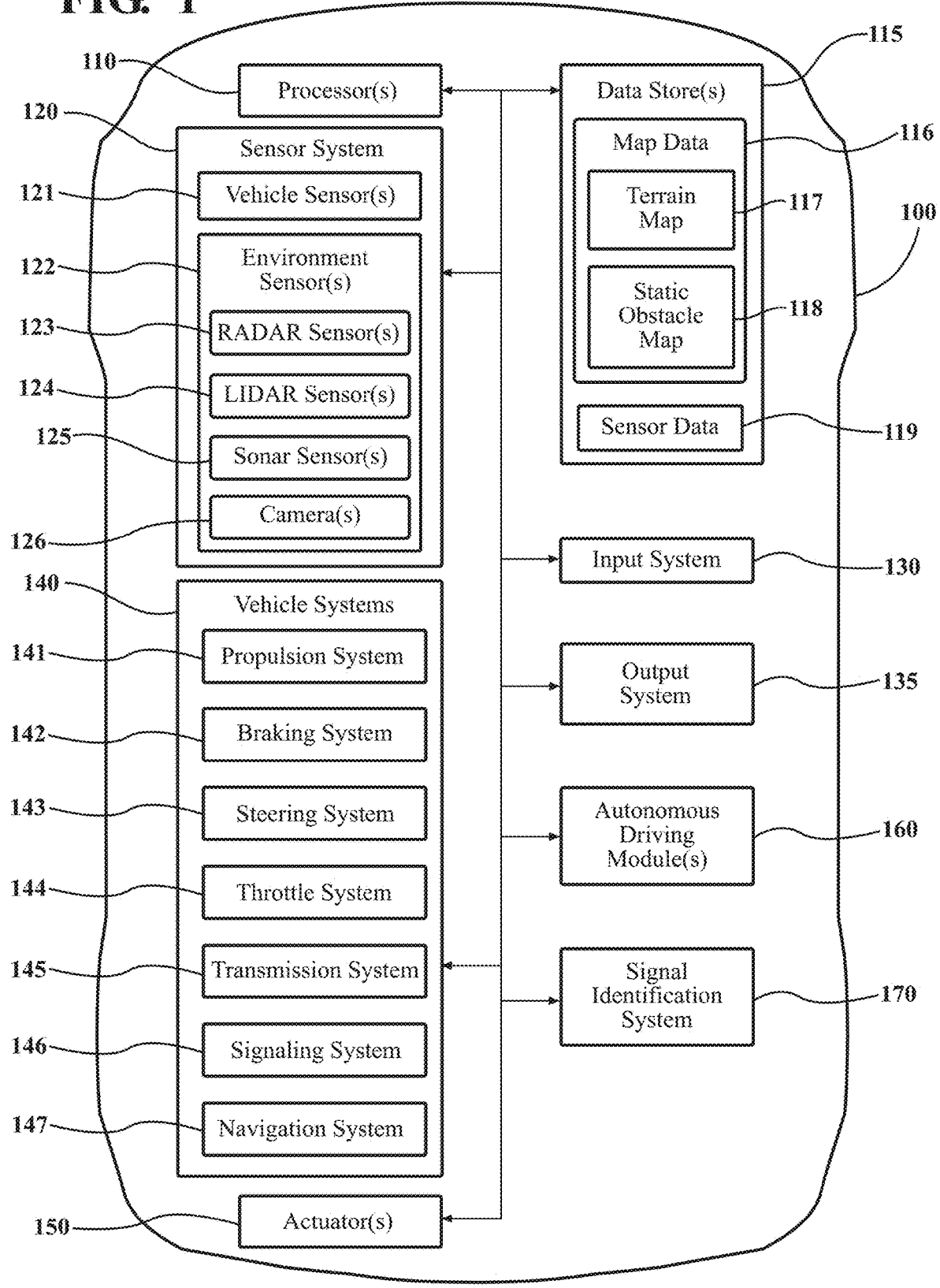
FIG. 1 illustrates one embodiment of a vehicle within which systems and methods disclosed herein may be implemented.

Systems, methods and other embodiments associated with identifying rear signal indicators of a vehicle are disclosed herein. As mentioned previously, identifying turn signals and brake signals of vehicles can be a difficult task. For example, various environmental circumstances such as variations in lighting conditions, relative movements of vehicles, color thresholds, differences in configurations of various makes/models of vehicles, and so on provide for a wide variability in the rear indicator signals that can complicate identification. Moreover, in some approaches, manually defined feature sets that attempt to approximate signal patterns are quickly proven inaccurate when encountering the noted variations in luminance and other circumstances. Thus, accurately identifying rear indicator signals is a complex endeavor that can encounter various difficulties.

Therefore, in one embodiment, a signal identification system monitors for nearby vehicles and, in response to detecting a nearby vehicle, uses a series of camera images to identify rear indicator signals. For example, the signal identification system, which is embedded within a host vehicle, monitors an area proximate to the host vehicle for other vehicles that are nearby. In one aspect, the signal identification system monitors for the nearby vehicles using cameras integrated with the host vehicle. Thus, upon detecting that a nearby vehicle is present, the cameras capture a series of images (e.g., 16 successive images) of a rear section of the nearby vehicle that can be used to identify a present state for turn signals and brake signals. It should be noted, that the series of images are captured and used for analysis of the present indicator state in order to capture temporal information about the indicators. That is, because the turn signals can be flashing and/or the brake lights may be momentarily released, the images are captured over a defined period of time to ensure a flashing dynamic state of the turn signals can be captured.

In either case, the images are separately analyzed to determine the braking state and the turn state. In one embodiment, a brake classifier accepts the raw images as an electronic input and analyzes the images using a combination of deep learning routines. That is, the brake classifier first determines spatial features within the images using a convolutional neural network to process the images and outputs the spatial features. Thereafter, the spatial features are fed into a long short-term memory recurrent neural network (LSTM-RNN) that iteratively processes images with the defined spatial features to ascertain whether the brake lights are presently active.

Furthermore, the turn state is determined using a turn classifier that functions in a similar manner as the brake classifier. However, prior to feeding the images into the turn classifier, the images are transformed to provide regions of interest. That is, in one embodiment, the images are processed to highlight particular regions (i.e., turn signals) and thereby improve identification. For example, a motion compensation algorithm can be applied to the images to produce flow images that account for relative motion between vehicles. Thereafter, the flow images are compared to determine differences (e.g., areas with changing pixel intensity). Subsequently, regions of interest within the difference images are identified and provided to the turn classifier.

The turn classifier further processes the regions of interest from the images according to a convolutional neural network to further identify spatial features within the images. Thereafter, a separate long short-term memory recurrent neural network (LSTM-RNN) iteratively processes the images to identify temporal information that correlates with dynamic flashing states of the turn signals. In this way, the signal identification system implements a structure for identifying rear indicator signals that overcomes the noted difficulties and thus improves identification through accounting for temporal changes and variations caused by variable luminance and motion.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles.

In some implementations, the vehicle 100 may be any other form of motorized transport that, for example, benefits from identifying a state of turn and brake indicators of nearby vehicles as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a signal identification system 170 that is implemented to perform methods and other functions as disclosed herein relating to detecting when a nearby vehicle is present and identifying rear indicator signals of the nearby vehicle. The noted functions and methods will become more apparent with a further discussion of the figures.

Figure 2:
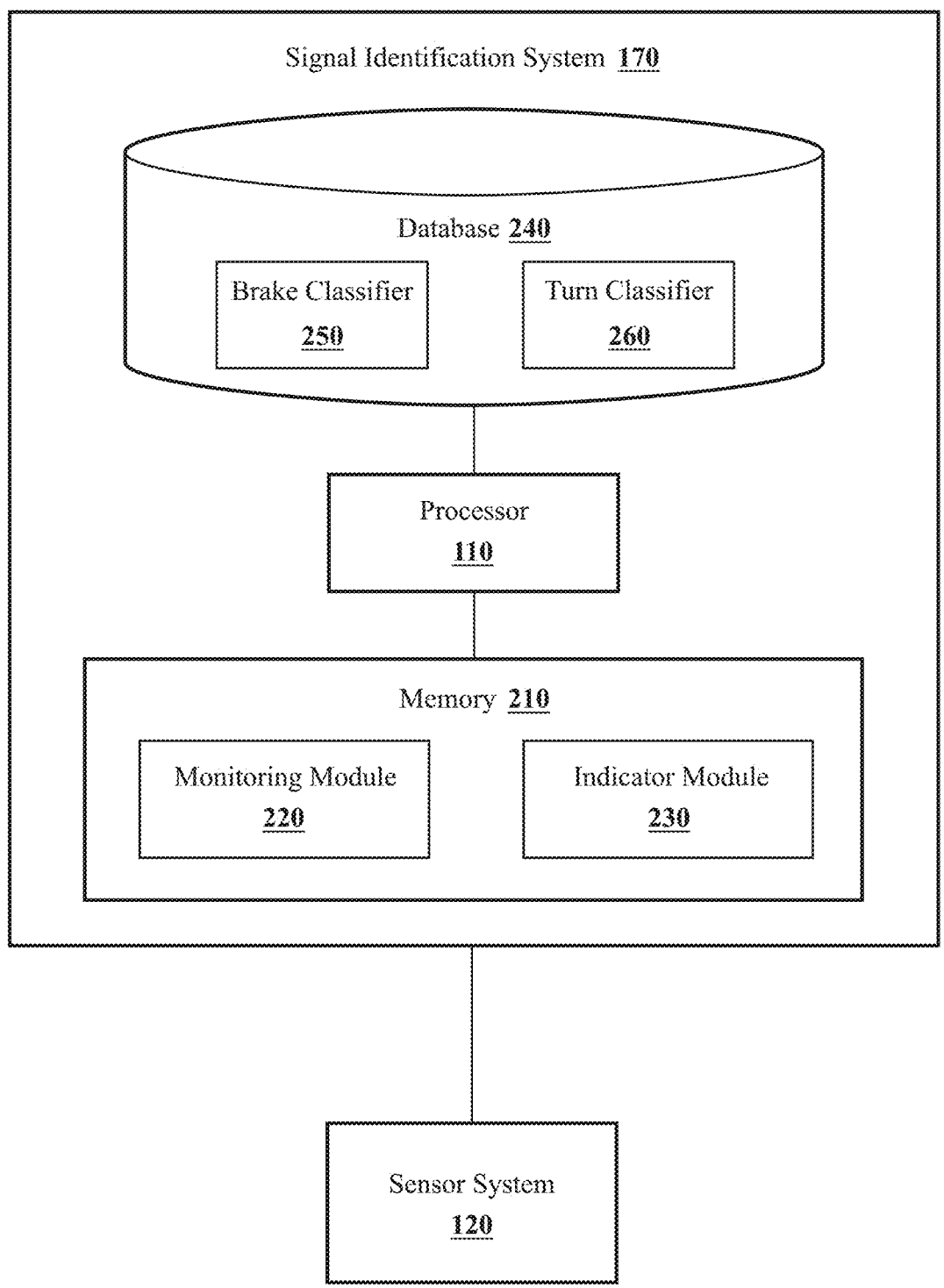
FIG. 2 illustrates one embodiment of a signal identification system that is associated with identifying rear indicator signals of a nearby vehicle.

With reference to FIG. 2, one embodiment of the signal identification system 170 of FIG. 1 is further illustrated. The signal identification system 170 is shown as including a processor 110 from the vehicle 100 of FIG. 1. Accordingly, the processor 110 may be a part of the signal identification system 170, the signal identification system 170 may include a separate processor from the processor 110 of the vehicle 100, or the signal identification system 170 may access the processor 110 through a data bus or another communication path. In either case, the processor 110 is illustrated as part of the signal identification system 170 for purposes of explanation. Additionally, in one embodiment, the signal identification system 170 includes a memory 210 that stores a monitoring module 220 and an indicator module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, in one embodiment, the monitoring module 220 generally includes instructions that function to control the processor 110 to acquire sensor data from, for example, one or more sensors of the sensor system 120. In one embodiment, the sensor data includes images from a camera 126 of an area in front of the vehicle 100 where a rear portion of a nearby vehicle is likely to be detected. In further aspects, the monitoring module 220 controls multiple different cameras of the sensor system 120 located at various points on the vehicle 100 and thus with different fields of view so that additional views of the surrounding environment can be obtained. Moreover, in additional aspects, the monitoring module 220 can control a Lidar 124, a radar 123, the camera 126, and/or other sensors in order to ascertain whether a nearby vehicle is present.

In either case, the monitoring module 220, monitors an electronic stream of sensor data from the camera and/or other noted sensors for the nearby vehicle. That is, the monitoring module 220 acquires the sensor data and analyzes the sensor data using one or more vehicle recognition techniques to determine when the nearby vehicle is present. Thus, in various embodiments, the monitoring module 220 implements image recognition, LIDAR object recognition, radar recognition, or combinations of the noted techniques in order to determine when the nearby vehicle is present. It should be understood that the various forms of object/vehicle recognition have varying properties and thus may be implemented in different circumstances to suit a particular implementation. For example, the different recognition techniques can have different distance thresholds at which objects can be effectively identified. Thus, in one embodiment, image recognition using images from the camera 126 is implemented to detect when vehicles are within a prescribed distance (e.g., 100 ft). In this way, the presence of nearby vehicles is determined so that additional feature identification (e.g., turn and brake lights) can be undertaken.

Once the nearby vehicle is detected, or, as part of detecting the nearby vehicle, the monitoring module 220 captures a series of signal images of the nearby vehicle. In general, the monitoring module 220 captures the signal images over a defined period of time. In one embodiment, the defined period of time is 0.5 seconds, but may be longer or shorter depending on particular aspects of implementation. For example, a lower bound for the defined period may be selected to ensure that at least one cycle of a turn signal is captured whereas an upper bound may be controlled by an available amount of memory. Moreover, a number of images captured during the defined period of time may be determined according to a frame rate of the camera 126 and/or other limiting factors. In either case, for a defined period of time of 0.5 seconds and a frame rate of 30 frames per second, the monitoring module 220 generally acquires 16 images in the series of images that form the signal images.

Additionally, the signal images are of a rear portion (i.e., aft section) of the nearby vehicle such that the signal images include imagery of both left and right turn lights and brake lights of the nearby vehicle. It should be understood that while the rear section of the vehicle and the rear indicator signals of the nearby vehicle are discussed as the primary implementation herein, in further aspects, the noted disclosed systems can be implemented to identify states of other indicators such as front turn signals, side turn signals (e.g., side-view mirror turn signals), and so on. Furthermore, in circumstances where the monitoring module 220 acquires the signal images with a view of the nearby vehicle that, for example, partially occludes the rear section of the vehicle (e.g., occludes one or more of the rear indicator signals), the monitoring module 220 controls the camera 126 to capture a replacement series of images or otherwise proceeds with processing the occluded signal images for which the indicator module 230 can provide at least a partial identification.

In general, the rear indicator signals of the nearby vehicle include brake lights that signal whether the nearby vehicle is presently braking and left/right turn signals/lights that indicate whether an operator of the nearby vehicle has activated a left turn indicator, a right turn indicator, or hazards. Thus, with reference to FIG. 3, one example of different turn states and braking states are illustrated with example images of vehicles. In general, the signal identification system 170 identifies eight possible states for the combination of braking states and turn states. As illustrated in examples (a)-(h) in FIG. 3 the different states are indicated according to separate letters. That is, a first letter correlates with whether the brake lights are presently active with "O" indicating off and "B" indicating that the brake lights are active. A second letter correlates with the left turn signal with "L" indicating that the left turn signal is active while "O" indicates that the left turn signal is inactive for the second letter. The third letter correlates with the right turn signal and indicates the right turn signal is active with "R" while "O" indicates the right turn signal is inactive for the third letter.

Accordingly, example (a) labeled "OOO" indicates that all of the indicator signals are inactive. Example (b) labeled "BOO" indicates that the brake lights are active while the turn signals are both inactive. Example (c) labeled "OLO" indicates that only the left turn signal is presently active. Example (d) labeled "BLO" indicates that both the brake lights and the left turn signal are active. Example (e) labeled "OOR" indicates that the right turn signal alone is active. Example (f) labeled "BOR" indicates that the brake lights in addition to the right turn signal are active. Example (g) labeled "OLR" indicates that both turn signals are active and thus hazards are presently activated. Example (h) labeled "BLR" indicates that the brake lights and both turn signals are active and thus the brakes are active while the hazards are also active. Thus, in various aspects, the signal identification system uses the labels indicated in FIG. 3 to encode output that identifies which of the rear indicator signals are active.

With further reference to FIG. 2 aspects of the indicator module 230 and how the separate states for the rear indicator signals are identified will now be discussed. The indicator module 230 receives the signal images as an electronic input from the monitoring module 220 in response to the monitoring module 220 detecting the nearby vehicle as previously discussed. Thus, the indicator module 230 accepts the signal images as an electronic input and provides a determination of the turn state and the brake state as an electronic output.

As a further matter prior to discussing additional aspects of the indicator module 230, in one embodiment, the signal identification system 170 includes a database 240. The database 240 is, for example, an electronic data structure stored in the memory 210 or another electronic data store and that is configured with routines that can be executed by the processor 110 for analyzing stored data, providing stored data, organizing stored data, and so on. Thus, in one embodiment, the database 240 stores data used/provided by the modules 220 and 230 in executing various functions. In one embodiment, the database 240 includes a brake classifier 250 and a turn classifier 260. Moreover, the database 240 may also store the signal images and/or other information used by the modules 220 and 230.

As will be discussed in further detail subsequently, the classifiers 250 and 260 are computational models that model aspects of images in relation to vehicles and rear signal indicators. Thus, the indicator module 230 uses the brake classifier 250 and the turn classifier 260 to analyze the signal images and determine the braking state and the turn state. Additionally, while the classifiers 250 and 260 are illustrated as being stored within the database 240, it should be understood that various components of the classifiers 250 and 260 can be integrated with the indicator module 230. In general, the classifiers 250 and 260 are complex functional components that are comprised of functional blocks and modeled data which function together to indicate probabilities of the different brake and turn states.

Moreover, the brake classifier 250 and the turn classifier 260 separately implement a similar combination of neural networks to process the signal images. In one embodiment, both the brake classifier 250 and the turn classifier 260 include a convolutional neural network (CNN) and a long short-term memory recurrent neural network (LSTM-RNN). In general, the CNN identifies and extracts spatial features through an iterative process of convolving the signal images, pooling results of the convolving, and then repeating the process of convolving and pooling using the pooled results from a previous iteration. The indication module 230 implements the CNN in this manner until a final fully connected layer outputs a feature map or other general indication of spatial features of the images after, for example, several iterations (e.g., 5 iterations of the CNN). The indicator module 230 then uses the spatial information from the CNN as an electronic input into the LSTM. In general, the LSTM is a type of recurrent neural network that determines temporal relationships or other temporal information about the spatial features identified by the CNN. That is, the LSTM-RNN includes aspects that account for changes between the images in order to identify dynamic flashing states of the turn signals, to account for variations in luminance, and so on. In either case, the indicator module 230 implements the LSTM-RNN to produce a prediction of the braking state and the turn state. The indicator module 230 then uses the prediction to generate an output that identifies the particular states as statistical likelihoods or probabilities.

Additionally, as noted, the brake classifier 250 and the turn classifier 260 separately implement versions of the CNN and the LSTM-RNN. In general, the distinctions relate to particular aspects of how the separate versions accept the signal images and also to how the separate versions are trained to identify the respective signals. For example, the brake classifier 250 is trained using a large data set of images that are of rear sections of different vehicles and that have brake lights in different states. Moreover, the images can have different properties such as different lighting conditions, color profiles, and so on. In general, the data set is labeled so that the brake classifier 250 can use back propagation or another technique to train the CNN and the LSTM-RNN of the brake classifier 250 to properly identify braking states.

Similarly, the turn classifier 260 is trained using a large data set of images with vehicles exhibiting different states of turn signals (e.g., left turn, right turn, hazards) that are also labeled to support backpropagation or another technique for training. Moreover, the indicator module 230 performs additional processing on the signal images prior to feeding the images into the turn classifier 260. For example, because the vehicle 100 and the nearby vehicle captured in the signal images are likely moving, the indicator module 230 compensates for the relative motion within the signal images. In one embodiment, the indicator module 230 processes the signal images to align the nearby vehicle between successive ones of the signal images, compares the images to determine differences and produce the differences as difference images, and then extract regions of interest from the difference images which are areas of the left and right turn signals. The indicator module 230 can then feed the regions of interest from the difference images into the turn classifier 260 instead of the raw signal images so that the turn classifier 260 can focus analysis on the turn signals and thereby avoid interference from variations (e.g., reflections, etc.) in the signal images, and other aberrations that can distract from identifying the turn state.

Additional aspects of the neural networks will be discussed in further detail in relation to subsequent figures. However, it should be understood that the indicator module 230 performs the identification of brake and turn states in parallel. Thus, while the braking state is discussed first, it should be understood that the ordering is not necessarily dependent or of particular importance. In either case, the indicator module 230 controls the brake classifier 250 and the turn classifier 260 to output predictions of the braking state and the turn state, respectively. The indicator module 230 can then further process the provided states to provide a soft determination of the respective states. That is, the indicator module 230 can provide the states as a probability that the respective signals are active. Alternatively, the indicator module 230 can provide a hard decision indicating that the individual signals are active or not such as in the notation of FIG. 3.

In either case, the indicator module 230 provides an output that identifies the turn state and the braking state. In one embodiment, the indicator module 230 can provide the outputs to the autonomous driving module 160, or a particular one of the vehicle systems 140 in order to inform or otherwise control various aspects of the vehicle 100. In one embodiment, the indicator module 230 generates indicators to a driver according to the turn state and/or the braking state in order to inform the driver of actions of the nearby vehicle. For example, the indicator module 230 can render graphics on a heads-up display, in-dash display, rear-view mirror, or other display. Additionally, or alternatively, the indicator module 230 can provide audible alerts about the turn state and/or the braking state.

As previously indicated, the indicator module 230 can provide the turn state and/or the braking state to the autonomous driving module 160. Thus, the autonomous driving module 160, in one aspect, uses the turn state and/or the braking state to further inform autonomous operation of the vehicle 100 and/or to inform advanced driver assistance components about objects/obstacles, trajectories, and so on.

Figure 4:
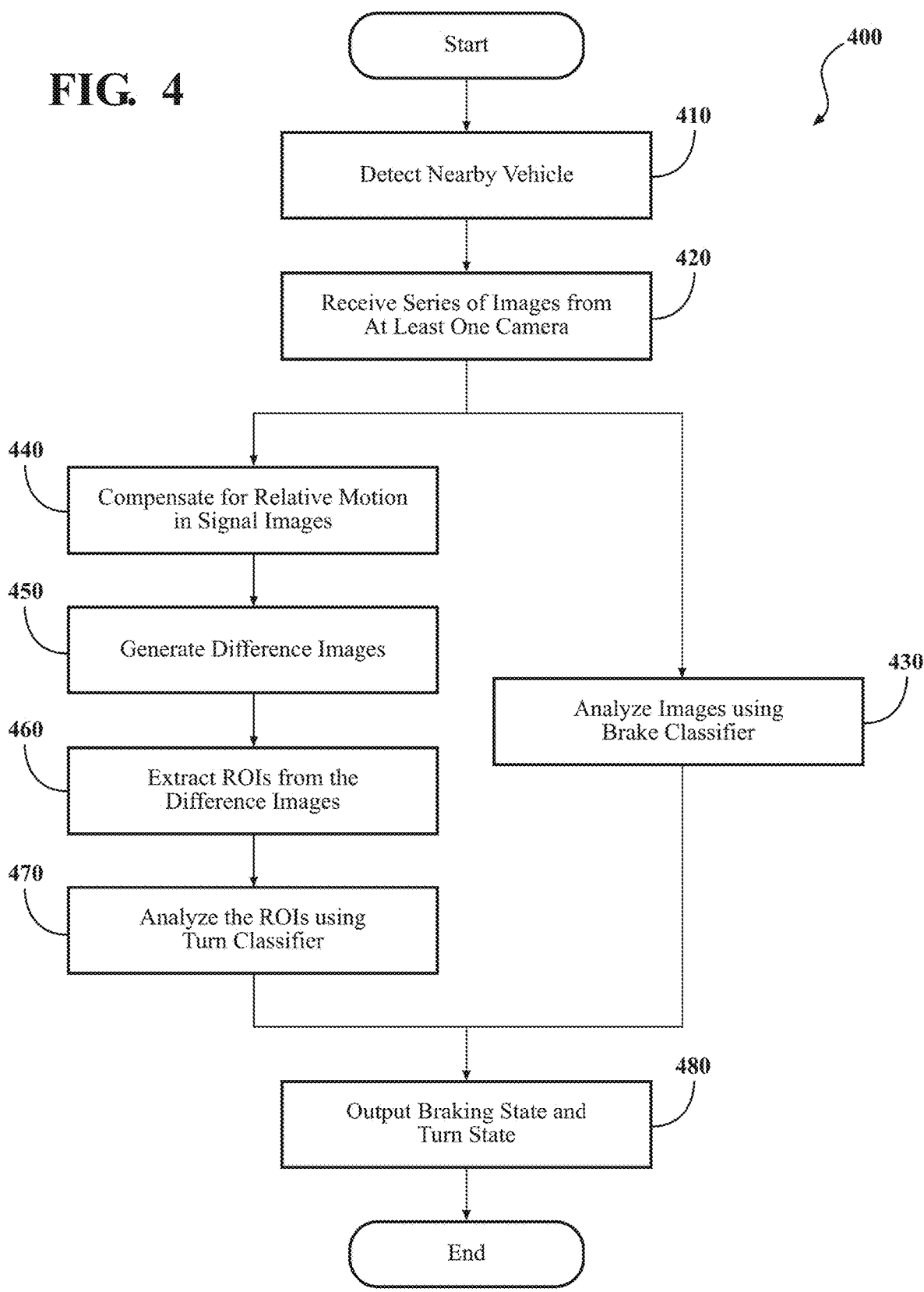
FIG. 4 illustrates one embodiment of a method that is associated with identifying rear indicators of a vehicle using camera images.

Additional aspects of identifying rear indicator signals of nearby vehicles will be discussed in relation to FIG. 4. FIG. 4 illustrates a flowchart of a method 400 that is associated with identifying a turn state and a braking state of a nearby vehicle as a function of rear indicator signals of the nearby vehicle. Method 400 will be discussed from the perspective of the signal identification system 170 of FIGS. 1 and 2. While method 400 is discussed in combination with the signal identification system 170, it should be understood that the method 400 is not limited to being implemented within the signal identification system 170, but is instead one example of a system that may implement the method 400.

At 410, the monitoring module 220 monitors for vehicles nearby the vehicle 100. In one embodiment, the monitoring module 220 monitors video images from a camera 126 using image recognition techniques to determine when a nearby vehicle is present. In general, the monitoring module 220 determines when the nearby vehicle is within a defined range of the vehicle 100. Moreover, the monitoring module 220 can also determine whether an orientation of the nearby vehicle is suitable (e.g., facing away) for further analysis according to the method 400. Also, as previously noted, the monitoring module 220 can monitor sensor data from additional sensors such as LIDAR, radar, and so on in order to detect the nearby vehicle and/or supplement detection of the nearby vehicle using the camera 126. In either case, the monitoring module 220 actively monitors a surrounding environment of the vehicle 100 in order to determine when the nearby vehicle is present so that identification of the rear indicator signals can be undertaken. As an additional point, it should be appreciated that a general configuration of the vehicle 100 and the camera 126 may be with a field of view of the camera 126 directed in front of the vehicle 100. However, in further implementations the camera 126 may have a different field of view and/or additional cameras can be provided with views directed in 360 degrees about the vehicle 100.

Moreover, while a single nearby vehicle is discussed, it should be appreciated that the signal identification system 170 can monitor for, identify, and determine rear indicator states for multiple nearby vehicles in parallel.

At 420, the monitoring module 220 captures signal images of a nearby vehicle detected at 410. In one embodiment, the monitoring module 220 captures the signal images as a series of images over a defined period of time. In this way, the monitoring module 220 can acquire temporal information about the nearby vehicle that characterizes changes in the turn signals and/or brake signals. For example, the monitoring module 220 can acquire a series of images from the camera that capture a cycle of the turn signals. Moreover, the monitoring module 220 can acquire the series of images to ensure that the brake lights are on and not simply briefly activated. Thus, the monitoring module 220 is configured, in one embodiment, to capture images over a span of time that is related to a standard blinking pattern of vehicle turn signals (e.g., >=0.5 s). Furthermore, a frame rate of the camera 126 can also influence how many images are in the series of signal images. That is, the monitoring module 220 may be configured to capture 16 images. Accordingly, if the frame rate of the camera is 30 fps, then the defined period of time is 0.5 seconds. Moreover, if the frame rate is higher or lower, then the number of images may be increased or decreased in order to ensure that a complete cycle of the dynamic flashing state of the turn signal is captured. In any case, the signal images generally include images captured at a frame rate of 30 fps over a defined period of time that correlates with at least a single cycle (e.g., on and off) of a turn signal.

Continuing with the method 400, as previously noted, the brake classifier 250 and the turn classifier 260 share a similar structure, but are customized for identifying the particular associated signal and are also trained for the particular signal. As shown in FIG. 4, block 430 generally correlates with processing by the brake classifier 250 while block 470 generally correlates with processing by the turn classifier 260. Furthermore, blocks 440, 450, and 460 represent preprocessing of the signal images prior to being electronically processed as inputs to the turn classifier 260.

At 430, the indicator module 230 analyzes the signal images using the brake classifier 250. In one embodiment, the indicator module 230 analyzes the signal images using the brake classifier 250, which employs processing via two separate neural networks. For example, the indicator module 230 first extracts spatial features of the nearby vehicle from the signal images according to a convolutional neural network that is trained to identify brake lights or otherwise discriminate between various features of the nearby vehicle. Thus, in one embodiment, the indicator module 230 convolves the signal images into layered spatial features and pools the layered spatial features over multiple iterations.

Thus, applying the CNN of the braking classifier 250 identifies the spatial features and generates an electronic output corresponding thereto.

Thereafter, the indicator module 230 uses the spatial features as an input to a long short-term memory recurrent neural network (LSTM-RNN). In one embodiment, the spatial features are provided along with the signal images in order to provide for labeling of aspects of the signal images. That is, the indicated spatial features identify locations and types of features within the signal images. Moreover, the LSTM-RNN for the brake classifier 250 is implemented by the indicator module 230 to learn or otherwise determine temporal dependencies between the signal images that are indicative of the braking state of the nearby vehicle. That is, the LSTM-RNN aspect refers to a manner of analyzing the signal images that accounts for temporal relationships between the spatial features as the signal images progress. In this way, the indicator module 230 can determine the spatial features (e.g., brake lights) within the signal images and analyze the spatial features for changes or general characteristics across the signal images that indicate whether the brake lights are presently active.

Figure 5:
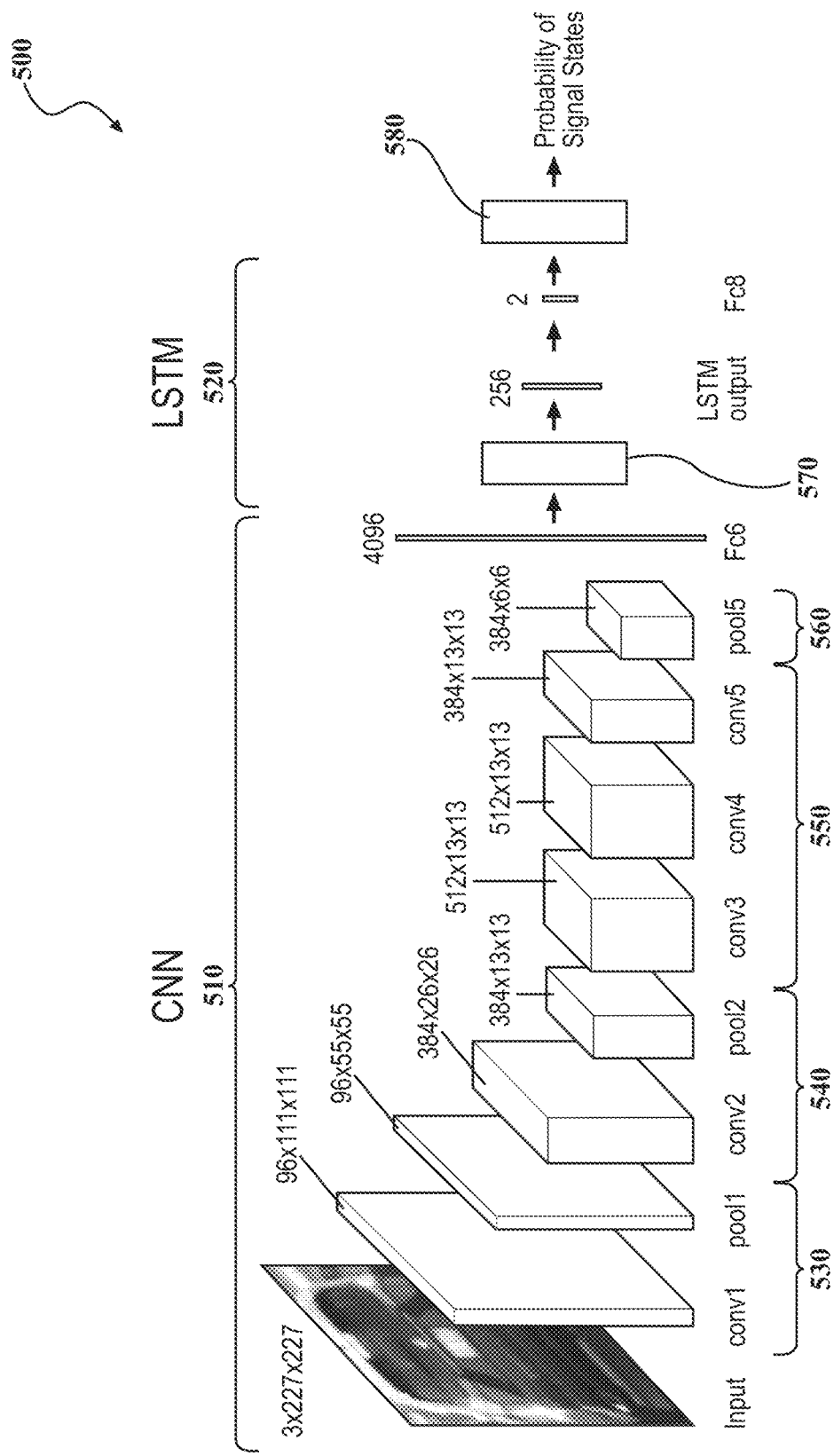
FIG. 5 is a diagram illustrating one embodiment of a classifier architecture.

As further explanation of the brake classifier 250, consider FIG. 5. FIG. 5 illustrates a diagram depicting an example structure 500 of the brake classifier 250 and the turn classifier 260 as disclosed herein. Thus, the example structure 500 for the classifiers 250 and 260 includes a convolutional neural network 510 and a long short-term memory (LSTM) recurrent neural network (RNN) 520 (also referred to simply as LSTM 520). The CNN 510 is illustrated as accepting an input in the form of a series of images. The input is convolved and pooled over five separate iterations 530, 540, 550, and 560 of the CNN 510. It should be noted that the iteration 550 includes multiple separate convolutions instead of a single convolution and pooling operation as in the further iterations.

In any case, the CNN 510 generally convolves the image or results of a previous iteration by convolving a filter or set of filters across the input to produce a filtered result. The filters generally characterize different aspects of the image by, for example, identifying color patterns, shapes, and so on. The pooling layer is, for example, a form of nonlinear down-sampling such as max pooling. In general, the pooling layers partition an input image into a set of non-overlapping regions with each region being characterized according to, for example, predominant aspects of the filtering results from the convolving layer. In this way, the CNN 510 progressively reduces a size of the input in order to further characterize spatial features therein. Thus, a fully connected layer fc6, as shown in FIG. 5 provides the output of the CNN 510 to the LSTM 520. The output of the CNN 510 is a characterization of spatial features within the signal images for the braking classifier 250 and a characterization of regions of interest for the turn classifier 260. Moreover, the CNN 510 executes separately for each image provided thereto.

The LSTM 520 is comprised of an LSTM functional block 570 that includes several nonlinear activation gates along with further functional elements. In general, the LSTM 520 functions to determine temporal information (i.e., relationships) between images in the series of signal images. Thus, by implementing the LSTM 520, long term dependencies in an input sequence (i.e., the signal images) can be maintained throughout the analysis without loss of information from dynamic flashing states of the turn signals.

Figure 6:
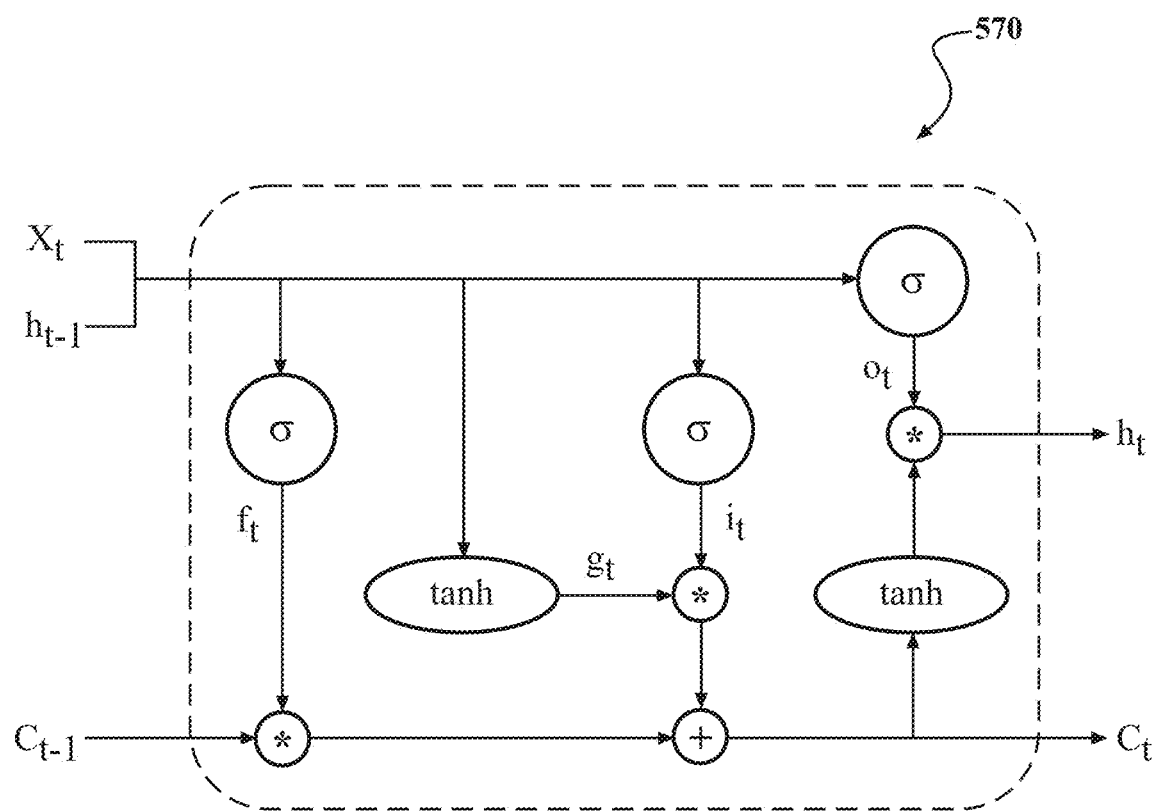
FIG. 6 is a diagram illustrating an example LSTM network.

As a more detailed explanation of the LSTM functional block 520 consider FIG. 6. As shown in FIG. 6, the LSTM functional block 570 accepts inputs of $X_t$, $h_{t-1}$, and $C_{t-1}$. Xt represents the spatial feature from fc6 of the CNN 510 at time t. The input $h_{t-1}$ is a hidden unit from a previous time step. Furthermore, at each subsequent time step (e.g., each iteration of the LSTM block 570), the LSTM 570 estimates the hidden unit $h_t$, which is provided to a next iteration as the input $h_{t-1}$. The LSTM block 570 also receives stored information of a memory cell $C_{t-1}$ that holds information from a previous iteration. The memory cell is updated at each iteration with newly calculated information and passed to a next iteration. As illustrated in FIG. 6, the LSTM block 570 includes different gates. In one embodiment, the LSTM block 570 includes a forget gate $f_t$ to determine what to discard from $x_t$ and $h_{t-1}$. The forget gate $f_t$ is a sigmoid function ($\sigma$), which, for example, outputs values from 0 to 1 and performs element-wise product with information of the previous memory cell state $C_{t-1}$ to determine what information to discard or to keep.

Additionally, input gate $i_t$ updates information to the memory cell $C_t$ and the hyperbolic tangent (tan h) layer $g_t$. The gates $i_t$ and $g_t$ control what to remember from $x_t$ and $h_{t-1}$, and then add to the values to provide the memory cell $C_t$ for a next iteration. In addition to updating the memory cell $C_t$, the LSTM block 570 also determines the hidden state $h_t$ at each iteration. An output gate of is computed and weighted with the memory cell state $C_t$ via tan h. An output for each iteration of the LSTM block 570 is provided to a fully connected layer fc8, as shown in FIG. 5. That is, the output for each iteration is used to compute a class probability at 580 as shown in FIG. 5. Thus, in order to account for temporal dependencies of an input sequence (i.e., dependencies between the signal images), a final output from the block 580 is used as a determination of the turn/brake state since sufficient temporal information is maintained within the LSTM block 570. In this way, the example classifier 500 can account for temporal dependencies between spatial features when determining states of rear signal indicators. Moreover, in a similar fashion, the brake classifier 250 analyzes the signal images using a braking CNN and a braking LSTM-RNN that have been trained for identifying brake light states.

With continued reference to FIG. 4 and method 400, at 440, the indicator module 230 aligns signal images to compensate for movement between the nearby vehicle and the vehicle 100. That is, because the nearby vehicle and/or the vehicle 100 can be moving while the signal images are captured, a position of the nearby vehicle within successive ones of the signal images can be different. This misalignment of the nearby vehicle between images in either position and/or orientation can cause discrepancies when analyzing the signal images at block 450. Therefore, the indicator module 230 compensates for the movement by processing the signal images to produce flow images that are transformed to align the nearby vehicle between successive ones of the signal images. In one embodiment, the indicator module 230 applies a scale invariant feature transformation (SIFT) flow algorithm to transform the signal images into the flow images at 440.

At 450, the indicator module 230 generates difference images from the flow images. In one embodiment, the indicator module 230 compares the flow images to determine differences and produces the differences images therefrom. That is, the difference images represent a subtraction between successive ones of the flow images such that the difference images indicate areas of changed pixels between successive flow images. Thus, generating the difference images effectively highlights areas of change between successive images such that the turn classifier 260 can focus on analyzing the noted areas.

As further explanation of how the indicator module 230 generates the difference images, consider FIG. 7, which illustrates an example 700 of compensating for motion as discussed at 440 and subsequently generating the difference image therefrom as discussed at 450. Accordingly, image (a) represents a previous image in the signal images whereas image (b) represents a current image for which the indicator module 230 is generating the difference image. Accordingly, the indicator module 230 first processes the image (b) to align the nearby vehicle pictured therein with the position and posture of the nearby picture in image (a). The flow image (otherwise referred to as the warped image) produced therefrom is pictured as image (d) whereas image (c) represents how the image (b) is shifted to compensate for the motion. Moreover, image (e) represents a difference image that results when the indicator module 230 performs an absolute difference comparison between image (d) and image (a). Thus, the image (e) is a difference image that illustrates how a right turn signal is highlighted within the difference image (e) as a result of flashing to an on state between images (a) and (b).

Figure 8:
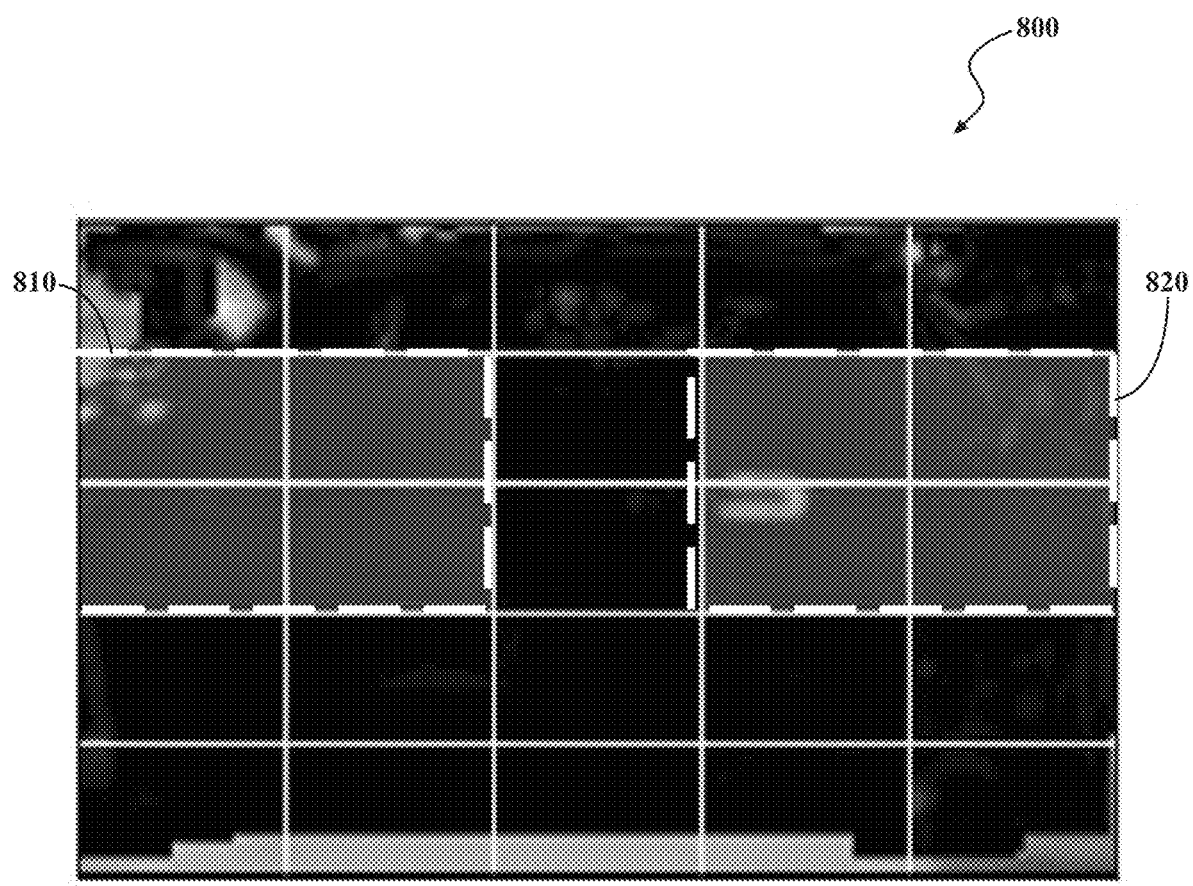
FIG. 8 is one example how regions of interest are isolated from the different images.

At 460, the indicator module 230 extracts regions of interest from the difference images. In one embodiment, the indicator module 230 extracts regions of interest from the difference images that correlate with the left turn signal and the right turn signal. For example, with reference to FIG. 8, a difference image 800 that correlates with image (e) of FIG. 7 is further illustrated. The indicator module 230 overlays a grid on the difference image as shown in FIG. 8. From the grid pattern, the indicator module 230 identifies regions (i.e., localized sub-portions of the image 800) that correlate with the left turn signal and the right turn signal. As shown in FIG. 8, the indicator module 230 has identified regions 810 and 820. Similarly, the indicator module 230 repeats the noted process for the difference images. Thus, the indicator module 230 produces a separate series of regions of interest that correlate with the left turn signal and the right turn signal. The indicator module 230 uses the regions of interest as electronic inputs into the turn classifier 260 in place of the full signal images as used by the brake classifier 250.

At 470, the indicator module 230 analyzes the regions of interest derived from the signal images using the turn classifier 260. In one embodiment, the indicator module 230 analyzes the regions of interest (ROIs) using the turn classifier 260 by applying two separate neural networks as previously explained in relation to FIG. 5. Thus, the indicator module 230 applies a turn CNN of the turn classifier 260 to generate spatial features from the ROIs as an electronic output.

Thereafter, the indicator module 230 uses the spatial features and the ROIs as an input to a turn long short-term memory recurrent neural network (LSTM-RNN). In one embodiment, the spatial features are provided along with the ROIs in order to provide for labeling of aspects of the ROIs. That is, the indicated spatial features identify locations and types of features within the ROIs. Moreover, the turn LSTM-RNN for the turn classifier 260 is implemented by the indicator module 230 to learn or otherwise determine temporal dependencies between the ROIs that are indicative of the turn state of the nearby vehicle. In this way, the indicator module 230 can determine the spatial features (e.g., turn lights) within the ROIs and analyze the spatial features for changes or general characteristics across the ROIs that indicate whether the different turn lights are presently active.

At 480, the indicator module 230 provides the turn state and the braking state as electronic outputs. In one embodiment, the indicator module 230 provides the states by electronically communicating the turn state and the braking state to one or more vehicle systems 140 and/or modules (e.g., module 160). In further examples, the indicator module 230 displays or otherwise provides the states to a driver in order to inform the driver about the nearby vehicle.

As one example, the indicator module 230 uses the turn state and the braking state as a manner of determining how to modify operating parameters of the one or more vehicle systems 140. That is, if the indicator module 230 determines that the brake lights are active, then an automatic collision avoidance system can be activated when within a particular range of the nearby vehicle. Moreover, if the indicator module 230 determines that the left turn signal is active, then the autonomous driving module 160 may plan a route around the nearby vehicle, and so on. In general, the output of the indicator module 230 that specifies the state of the rear indicator signals can be used as a manner of informing many different systems of the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s)

110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the signal identification system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the signal identification system 170, and/or the autonomous driving module(s) 160 may control some or all of these vehicle systems 140 and, thus, may be partially or fully autonomous.

The processor(s) 110, the signal identification system 170, and/or the autonomous driving module(s) 160 can be operatively connected to communicate with the various vehicle systems 140 and/or individual components thereof. For example, returning to FIG. 1, the processor(s) 110, the signal identification system 170, and/or the autonomous driving module(s) 160 can be in communication to send and/or receive information from the various vehicle systems 140 to control the movement, speed, maneuvering, heading, direction, etc. of the vehicle 100. The processor(s) 110, the signal identification system 170, and/or the autonomous driving module(s) 160 may control some or all of these vehicle systems 140.

The processor(s) 110, the signal identification system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the signal identification system 170, and/or the autonomous driving module(s) 160 can control the direction and/or speed of the vehicle 100. The processor(s) 110, the signal identification system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). In one embodiment, the signal identification system 170 can collect data about control signals from the processor 110 and the autonomous driving module 160 that cause the vehicle to accelerate, decelerate, and perform other various maneuvers and/or why the autonomous driving module 160 induced the maneuvers. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the signal identification system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A signal identification system for identifying rear indicators of a nearby vehicle, comprising:
   one or more processors;
   a memory communicably coupled to the one or more processors and storing:
   a monitoring module including instructions that when executed by the one or more processors cause the one or more processors to, in response to detecting the nearby vehicle, capturing signal images of a rear portion of the nearby vehicle; and
   an indicator module including instructions that when executed by the one or more processors cause the one or more processors to:
   i) compute a braking state for brake lights of the nearby vehicle that indicates whether the brake lights are presently active by analyzing the signal images according to a brake classifier, and
   ii) compute a turn state for rear turn signals of the nearby vehicle that indicates which of the rear turn signals are presently active by analyzing regions of interest from the signal images according to a turn classifier,
   wherein the brake classifier and the turn classifier are each comprised of a combined network architecture including both a convolutional neural network (CNN) and a long short-term memory recurrent neural network (LSTM-RNN) configured in series with the LSTM-RNN accepting an input that is a final output of the CNN, and
   wherein the indicator module includes instructions to provide electronic outputs identifying the braking state and the turn state and to control one or more vehicle systems of a host vehicle in response to the electronic outputs.

2. The signal identification system of claim 1, wherein the indicator module further includes instructions to:
   generate the regions of interest from the signal images by
   i) compensating for movement of the nearby vehicle between the signal images to produce flow images from the signal images,
   ii) comparing the flow images to generate difference images that indicate areas of changed pixels in the flow images, and
   iii) extracting the regions of interest from the difference images.

3. The signal identification system of claim 2, wherein the indicator module further includes instructions to compensate for the movement by computing the flow images using a scale invariant feature transformation (SIFT) flow algorithm to transform the signal images into the flow images, wherein the regions of interest include a region for a left turn indicator and a region for a right turn indicator of the nearby vehicle, and wherein each of the regions of interest are a separate series of difference images that isolate the left turn indicator and the right turn indicator.

4. The signal identification system of claim 1, wherein the indicator module further includes instructions to compute the braking state by:
   i) extracting image spatial features of the nearby vehicle from the signal images by convolving the signal images into layered spatial features and pooling the layered spatial features over multiple layers of a braking convolutional neural network (CNN) of the brake classifier to generate the image spatial features as an electronic output at a fully connected layer of the braking CNN, and
   ii) determining, using the image spatial features, temporal dependencies between the signal images that are indicative of the braking state by recurrently analyzing the image spatial features from the signal images according to a braking long short-term memory recurrent neural network (LSTM-RNN) of the brake classifier that indicates the braking state as a probability that the brake lights are presently active,
   wherein the braking CNN and the braking LSTM-RNN are trained to identify the braking state.

5. The signal identification system of claim 1, wherein the indicator module further includes instructions to compute the turn state by:
   i) extracting spatial features from the regions of interest by convolving the regions into layered spatial features and pooling the layered spatial features over multiple layers of a turn convolutional neural network (CNN) of the turn classifier to generate the spatial features as an electronic output at a fully connected layer of the turn CNN, and
   ii) determining, using the spatial features and the regions of interest, temporal dependencies that are indicative of the turn state by recurrently analyzing the spatial features from the regions of interest according to a turn long short-term memory recurrent neural network (LSTM-RNN) of the turn classifier that iteratively analyzes the regions of interest in relation to a series of the signal images and indicates the turn state as a probability of a particular dynamic flashing state of the rear turn signals,
   wherein the turn CNN and the turn LSTM-RNN are trained to identify the turn state.

6. The signal identification system of claim 1, wherein the monitoring module includes the instructions to capture the signal images including instructions to capture the signal images as a series over a defined period of time in order to capture temporal changes in the rear turn signals, and wherein the monitoring module further include instructions to detect the nearby vehicle including instructions to control at least a camera sensor to analyze acquire scan images of a surrounding environment and analyze the scan images for a presence of the nearby vehicle.

7. The signal identification system of claim 1, wherein controlling the one or more vehicle systems of the host vehicle by modifying operating parameters of the one or more vehicle systems in response to the braking state and the turn state.

8. The signal identification system of claim 1, wherein the signal identification system is embedded within an autonomous driving module of a host vehicle.

9. A non-transitory computer-readable medium storing for identifying rear indicators of a nearby vehicle and including instructions that when executed by one or more processors cause the one or more processors to:
   compute a braking state for brake lights of the nearby vehicle that indicates whether the brake lights are presently active by analyzing signal images according to a brake classifier, the signal images being captured of a rear portion of the nearby vehicle; and compute a turn state for rear turn signals of the nearby vehicle that indicates which of the rear turn signals are presently active by analyzing regions of interest from the signal images according to a turn classifier, wherein the brake classifier and the turn classifier are each comprised of a combined network architecture including both a convolutional neural network (CNN) and a long short-term memory recurrent neural network (LSTM-RNN) configured in series with the LSTM-RNN accepting an input that is a final output of the CNN;

provide electronic outputs identifying the braking state and the turn state; and control one or more vehicle systems of a host vehicle in response to the electronic outputs.

10. The non-transitory computer-readable medium of claim 9, further comprising: instructions to, in response to detecting the nearby vehicle, capture the signal images of a rear portion of the nearby vehicle.

11. The non-transitory computer-readable medium of claim 10, further comprising instructions to:

generate the regions of interest from the signal images by
i) compensating for movement of the nearby vehicle between the signal images to produce flow images from the signal images,
ii) comparing the flow images to generate difference images that indicate areas of changed pixels in the flow images, and
iii) extracting the regions of interest from the difference images.

12. The non-transitory computer-readable medium of claim 9, wherein the instructions to compute the braking state include instructions to:

i) extract image spatial features of the nearby vehicle from the signal images by convolving the signal images into layered spatial features and pooling the layered spatial features over multiple layers of a braking convolutional neural network (CNN) of the brake classifier to generate the image spatial features as an electronic output at a fully connected layer of the braking CNN, and ii) determine, using the image spatial features, temporal dependencies between the signal images that are indicative of the braking state by recurrently analyzing the image spatial features from the signal images according to a braking long short-term memory recurrent neural network (LSTM-RNN) of the brake classifier that indicates the braking state as a probability that the brake lights are presently active, wherein the braking CNN and the braking LSTM-RNN are trained to identify the braking state.

13. The non-transitory computer-readable medium of claim 9, wherein the instructions to compute the turn state include instructions to:

i) extract spatial features from the regions of interest by convolving the regions into layered spatial features and pooling the layered spatial features over multiple layers of a turn convolutional neural network (CNN) of the turn classifier to generate the spatial features as an electronic output at a fully connected layer of the turn CNN, and ii) determine, using the spatial features and the regions of interest, temporal dependencies that are indicative of the turn state by recurrently analyzing the spatial features from the regions of interest according to a turn long short-term memory recurrent neural network (LSTM-RNN) of the turn classifier that iteratively analyzes the regions of interest in relation to a series of the signal images and indicates the turn state as a probability of a particular dynamic flashing state of the rear turn signals, wherein the turn CNN and the turn LSTM-RNN are trained to identify the turn state.

14. A method of identifying rear indicators of a nearby vehicle, comprising:

in response to detecting the nearby vehicle, capturing signal images of a rear portion of the nearby vehicle;

computing a braking state for brake lights of the nearby vehicle that indicates whether the brake lights are presently active by analyzing the signal images according to a brake classifier;

computing a turn state for rear turn signals of the nearby vehicle that indicates which of the rear turn signals are presently active by analyzing regions of interest from the signal images according to a turn classifier, wherein the brake classifier and the turn classifier are each comprised of a combined network architecture including both a convolutional neural network (CNN) and a long short-term memory recurrent neural network (LSTM-RNN) configured in series with the LSTM-RNN accepting an input that is a final output of the CNN;

providing electronic outputs identifying the braking state and the turn state; and controlling one or more vehicle systems of a host vehicle in response to the electronic outputs.

15. The method of claim 14, further comprising:

generating the regions of interest from the signal images by
i) compensating for movement of the nearby vehicle between the signal images to produce flow images from the signal images,
ii) comparing the flow images to generate difference images that indicate areas of changed pixels in the flow images, and
iii) extracting the regions of interest from the difference images.

16. The method of claim 15, wherein compensating for the movement includes computing the flow images using a scale invariant feature transformation (SIFT) flow algorithm to transform the signal images into the flow images, wherein the regions of interest include a region for a left turn indicator and a region for a right turn indicator of the nearby vehicle, and wherein each of the regions of interest are a separate series of difference images that isolate the left turn indicator and the right turn indicator.

17. The method of claim 14, wherein analyzing the signal images according to the brake classifier includes:

i) extracting image spatial features of the nearby vehicle from the signal images by convolving the signal images into layered spatial features and pooling the layered spatial features over multiple layers of a braking convolutional neural network (CNN) of the brake classifier to generate the image spatial features as an electronic output at a fully connected layer of the braking CNN, and ii) determining, using the image spatial features, temporal dependencies between the signal images that are indicative of the braking state by recurrently analyzing the image spatial features from the signal images according to a braking long short-term memory recurrent neural network (LSTM-RNN) of the brake classifier that indicates the braking state as a probability that the brake lights are presently active,
wherein the braking CNN and the braking LSTM-RNN are trained to identify the braking state.

18. The method of claim 14, wherein analyzing the regions of interest according to the turn classifier includes:
  i) extracting spatial features from the regions of interest by convolving the regions into layered spatial features and pooling the layered spatial features over multiple layers of a turn convolutional neural network (CNN) of the turn classifier to generate the spatial features as an electronic output at a fully connected layer of the turn CNN, and
  ii) determining, using the spatial features and the regions of interest, temporal dependencies that are indicative of the turn state by recurrently analyzing the spatial features from the regions of interest according to a turn long short-term memory recurrent neural network (LSTM-RNN) of the turn classifier that iteratively analyzes the regions of interest in relation to a series of the signal images and indicates the turn state as a probability of a particular dynamic flashing state of the rear turn signals,
wherein the turn CNN and the turn LSTM-RNN are trained to identify the turn state.

19. The method of claim 14, wherein capturing the signal images includes capturing the signal images as a series over a defined period of time in order to capture temporal changes in the rear turn signals, and wherein detecting the nearby vehicle includes using at least a camera sensor to analyze a surrounding environment for a presence of the nearby vehicle.

20. The method of claim 14, wherein controlling the one or more vehicle systems of the host vehicle by modifying operating parameters of the one or more vehicle systems in response to the braking state and the turn state.

* * * * *

UNITED STATES PATENT AND TRADEMARK OFFICE
CERTIFICATE OF CORRECTION

PATENT NO. : 10,691,962 B2  
APPLICATION NO. : 15/713491  
DATED : June 23, 2020  
INVENTOR(S) : Xue Mei et al.

Page 1 of 1

It is certified that error appears in the above-identified patent and that said Letters Patent is hereby corrected as shown below:

On the Title Page

Item (57) Abstract, Line 1:
Change "System, methods, and…" to "Systems, methods, and…"

In the Claims

Claim 9, Column 22, Line 62:
Delete "storing" after "medium"

Signed and Sealed this
Twenty-seventh Day of October, 2020

Andrei Iancu
*Director of the United States Patent and Trademark Office*